(No Model.)
G. W. JOPSON.
KEY RING.
No. 276,826.　　　　　　　　Patented May 1, 1883.
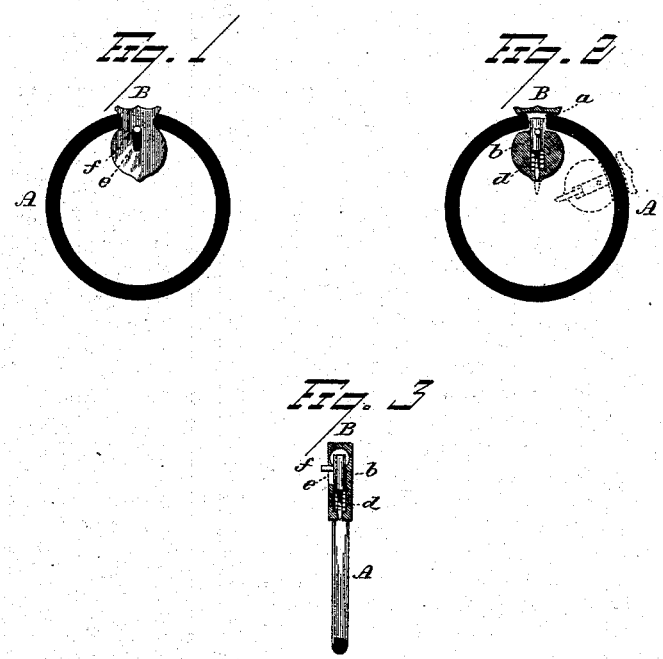

UNITED STATES PATENT OFFICE.

GEORGE W. JOPSON, OF MERIDEN, CONNECTICUT.

KEY-RING.

SPECIFICATION forming part of Letters Patent No. 276,826, dated May 1, 1883.

Application filed December 7, 1882. (No model.)

*To all whom it may concern:*

Be it known that I, GEORGE W. JOPSON, of Meriden, in the county of New Haven and State of Connecticut, have invented a new Improvement in Key-Rings; and I do hereby declare the following, when taken in connection with accompanying drawings and the letters of reference marked thereon, to be a full, clear, and exact description of the same, and which said drawings constitute part of this specification, and represent, in—

Figure 1, a side view; Fig. 2, a longitudinal section in the plane of the ring; Fig. 3, a transverse section.

This invention relates to an improvement in the ring or device commonly used for carrying keys, and such as constructed so as to be opened for the introduction or removal of the keys, the object being a simple device by which the opening may be locked so as to prevent the accidental displacement of the keys; and the invention consists in a ring cut so as to leave a small space between the two ends, a sleeve upon the ring which will pass over the opening between the two ends, so as to close that opening, or removed therefrom to open it, and a bolt which, when the sleeve is over the opening, will enter said opening and prevent accidental displacement of the sleeve, as more fully hereinafter described.

A represents the ring, which may be of any convenient shape or size. At one point in the ring a cut is made so as to leave a space, $a$, between the two ends. Onto the ring a sleeve, B, is placed, which will pass freely around the ring, over or away from the opening in the ring, as indicated in Fig. 2. Into this sleeve a bolt, $b$, is introduced, preferably with a spring, $d$, the tendency of which is to force the bolt into the opening through the sleeve, and so that when the sleeve is passed over the opening, as seen in Fig. 2, the bolt will be forced into the space in the ring, and thereby lock the sleeve in that position, from which it cannot be removed until the bolt is withdrawn, as indicated in broken lines; but when the bolt is so withdrawn the sleeve will be turned away from the opening, as seen in broken lines, Fig. 2, for the introduction or removal of keys. In the sleeve a slot, $e$, is made, through which a stud, $f$, from the bolt extends, so that the bolt may be readily moved to disengage or re-engage the sleeve. The sleeve is best made in the form of a tag, so that its surface will present a convenient space for the name of the owner, as shown. If the spring for the bolt be not employed, the bolt must be arranged with sufficient friction so as to retain its place when thrown into the locking condition.

By this invention not only is a secure locking device provided for the opening in the ring, but that locking device serves also as a name-tag—a desirable feature in a key-ring.

I do not wish to be understood as claiming, broadly, a slide which, moving on the one part, will overlap the other part.

I claim—

The combination of the ring, cut to form a recess, with a sleeve, arranged to slide upon said ring over said opening to close it or away from it to open it, and a locking-bolt to enter the opening in the ring, substantially as described.

GEORGE W. JOPSON.

Witnesses:
 JOHN JOPSON, Jr.,
 E. C. BIRDSEY.